(12) United States Patent
Barnett

(10) Patent No.: US 6,170,281 B1
(45) Date of Patent: Jan. 9, 2001

(54) WEATHER SHIELD SOLAR HEAT COLLECTOR PER REFLECTOR

(76) Inventor: Karl Vernon Lee Barnett, Apt. 11-K, Ascension Dr., Asheville, NC (US) 28806

( * ) Notice: Under 35 U.S.C. 154(b), the term of this patent shall be extended for 0 days.

(21) Appl. No.: 09/261,310

(22) Filed: Mar. 2, 1999

(51) Int. Cl.[7] .................................................. F25D 23/12
(52) U.S. Cl. .......................................... 62/259.1; 312/236
(58) Field of Search ......................... 62/259.1; 312/236, 312/292, 222.3

(56) References Cited

U.S. PATENT DOCUMENTS

| | | | | |
|---|---|---|---|---|
| 4,730,423 | * | 3/1988 | Hughes | 52/173 |
| 4,953,328 | * | 9/1990 | Sewell et al. | 52/79.1 |

* cited by examiner

Primary Examiner—Henry Bennett
Assistant Examiner—Chen-Wen Jiang

(57) ABSTRACT

A weather shield is a cover of rigid material of sufficient size and shape, to accommodate the complete surrounding of the exterior unit of a heat pump, or central air conditioning system, which, when installed over the exterior unit, will be a shelter from the weather conditions of rain, snow, sleet, hail, wind, cold, and heat; by acting as an umbrella to divert the weather conditions, be a shield to impede the movement of the natural flow of air currents, act in the capacity of an energy saver, by collecting heat from solar rays through an absorbant pigment coating, or by repelling heat from solar rays through the use of a white reflective pigment coating, or attachable panels of a white durable material, act to decrease the recirculation of air flow produced by the exterior unit'fan which circulates air through the heat exchanger.

2 Claims, 5 Drawing Sheets

WEATHER SHIELD SOLAR HEAT COLLECTOR PER REFLECTOR

BACKGROUND OF THE INVENTION

The field of endeavor, of this invention, is in the heating and air conditioning technical field, as pertains to the exterior unit of heat pumps and air conditioning systems.

The subject matter of the claimed invention is centered around the said exterior unit, the function of which is to act as the heart, veins, lungs and soul of said system, having a compressor that pumps, by means of tubing thru the air circulation system of the heat exchange coils, fed by a forced air fan.

The soul of the heating and cooling process center, is the said exterior unit heat exchange system, which is located outdoors in a harsh environment, with an unimpeded access of the weather elements of rain, snow, sleet, hail, wind, cold, and extreme heat, which drastically reduces the said heat exchange effect, by;

1) introducing moisture per water, directly into the said air circulation system, which interacts with cold unregulated winds to freeze-up the said tubing and reduces or totally stops air flow, 2) being illuminated daily by solar heat rays, which are either wasted during heat cycle season or endured as a burden to overcome during the cooling cycle season.

Where as, the use of said heat pumps and central air conditioning exterior units, have been plagued by continuous problems such as;

A) the lack of adequate weather protection,

B) the unavoidable placement, of said exterior unit, in weather conditions, which by nature are the total opposite of conditions needed for the optimal heating and cooling exchange functions of the freon conduit, employed by said exterior unit'compressor, to transfer;

A) heat from a heat starved environment of the outdoors, through piping, into the indoors, B) heat from the indoors, into a heat rich environment, of the outdoors, through said piping, C) said heat, through forced air flow, by use of electric motors, into an already hot summer environment, D) said heat, pick up from a cold winter environment to be transported indoors.

Therefore, the use of the weather shield and solar heat collector per reflector, will be a solution, to said problems, by means of;

A) a cover of rigid material of sufficient size and shape to accommodate the complete surrounding of said exterior unit, which will shelter the said exterior unit from the said weather conditions of rain, snow, sleet, hail, wind, cold and heat, B) by acting as;

1) an umbrella to divert said weather conditions, 2) a shield to impede the movement of the natural flow of air currents, which produce a wind chill effect, 3) act in the capacity of energy saver, by:

A) collecting heat from solar rays thru the use of a black absorbant pigment coating, B) repelling heat from solar rays thru the use of a white reflective pigment coating, or attachable panels of a white durable material, C) reducing the constant defrost cycles caused by weather related moisture freeze-ups on said exterior units coils, D) act to control the recirculation of air flow produced by said exterior unit'fan, which circulates air through the heat exchanger.

Further, references to specific problems involved in the prior art, are as follows:

A) College level, book of study, Refrigeration and Air Conditioning Technology, 2nd Edition by Whitman, Johnson, published by Delmar;

A) Page 799, chapter 45, section 25 reads as follows;

The outdoor unit installation for a heat pump is much like a central air conditioning system from an air flow standpoint. The unit must have a good air circulation around it, and the discharge air must not be allowed to recirculate.

There are some more serious considerations that should be dealt with. The direction of the prevailing wind in the winter could lower the heat pump performance. If the unit is located in a prevailing north wind or a prevailing wind from a lake, the performance may not be up to standard. A prevailing north wind might cause evaporation to operate at a lower than normal temperature. A wind blowing inland off a lake will be very humid and might cause freezing problems in the winter.

The outdoor unit must not be located where roof water will pour into it. The outdoor unit will be operating at below freezing much of the time, and any moisture or water that is not in the air itself, should be kept away from the unit's coil. If not, excess freezing will occur.

The outdoor unit is an evaporator in winter and will attract moisture from the outside air. If the coil is operating below freezing, the moisture will freeze on the coil. If the coil is freezing, the moisture will run off the coil as it does in an air conditioning evaperator. This moisture must have a place to go. If the unit is in a yard, the moisture will soak into the ground. If the unit is on a porch or walk, the moisture could freeze and create slippery conditions, FIGS. 45–30.

The outdoor unit is designed with drain holes or pans in the bottom of the unit to allow free movement of water away from the coil. If they are inadequate, the coil will become a solid block of ice in cold weather. When the coil is frozen solid, it is a poor heat exchanger with the outside air, and the C.O.P. will be reduced. Defrosting methods are discussed later.

So, you can see that a problem has existed for decades with no design or consideration given for the control of the problem. The prior art solution has been, to;

1) move it to an area where hopefully the wind isn't as strong, 2) keep the outdoor unit away from falling water by locations, 3) drill holes in bottom to drain the unimpeded water flow, B) As of Feb. 16, 1999, a patent search of the U.S.P.T.O. Gov./ web site has given the following patent data base information;

1) Heat Pump weather shield—O occurrences in O patents,

2) Heat Pump cabinet weather protection—O occurences in O patents,

3) Heat Pump cabinet protectors—O occurences in O patents,

4) Heat Pump and Air Condition weather shield—O occurrences in O patents.

The problem exist, but, no solution, until now.

C) Also, the U.S.P.T.O. Gov/ patent data base search results on the subject of heat pumps with solar heat is as follows;

1) heat pumps with solar heat source to Wallin, et. al. U.S. Pat. No. 4,030,312 on Jan. 21, 1977, 2) combination heat pump and low temperature solar heat collector to Ramey, U.S. Pat. No. 4,005,583 on Feb. 01, 1977, 3) several other related topic patents issued, but none similar to the invention.

D) conclusion, the novelty of the unobvious approach taken by the inventor, is to go to the core of the problems, stop the water and wind from gaining access to the sensitive heat exchange system, use the sun'solar rays to an advantage, absorb when you need heat, reflect when you need cooling.

This invention is definitely an improvement, to the prior art, as relates to the said exterior units of heat pumps and air conditioning systems!

BRIEF SUMMARY OF THE INVENTION

The general idea of the claimed invention in a summarized form is;

A) a cover of rigid material of sufficient size and shape as to accommodate the complete surrounding of the said exterior unit, which will shelter the said exterior unit from the weather conditions of rain, snow, sleet, hail, winds, cold, and the heat, by acting as an umbrella to divert said weather conditions, a shield to impede the movement of the natural flow of air currents, which produce a wind chill effect, to act in the capacity of an energy saver by collecting heat from solar rays thru the use of absorbant pigment coatings, repelling heat from solar rays thru the use of a white reflective pigment coating, or attachable panels of a white durable material, B) the object of the invention is to be a solution to some of the problems of the said exterior unit, there by reducing the constant defrosting cycles, which reverses the heating cycle back to removing heat from the indoors, so as to heat the frozen water on the said exterior unit, and make the heat pump and air conditioning systems more operationally and energy efficient, by adding solar heat to heat exchange air in winter or removing solar heat from said heat exchange in the summer, to act as an air regulator, to reduce the recirculation of air flow thru the said heat exchange.

BRIEF DESCRIPTION OF THE SEVERAL VIEWS OF THE DRAWINGS

The following, is a list of all figures, by number, with corresponding statements explaining what each figure depicts.

Figure 13A:
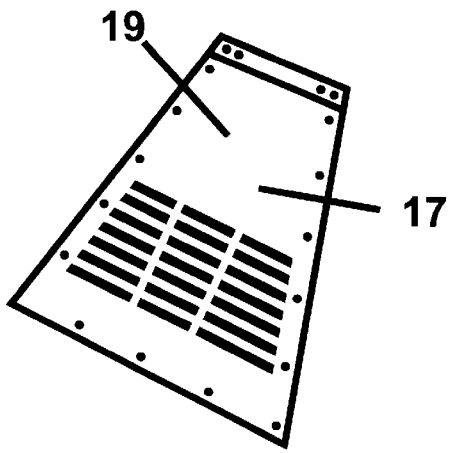
Figure 13B:
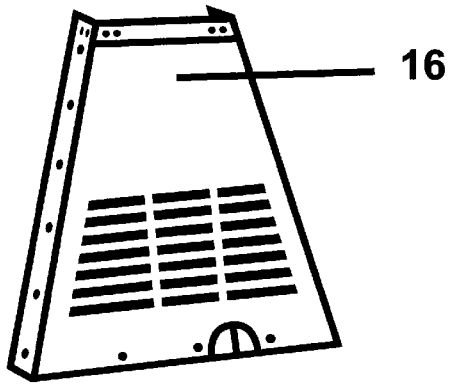
Figure 13C:
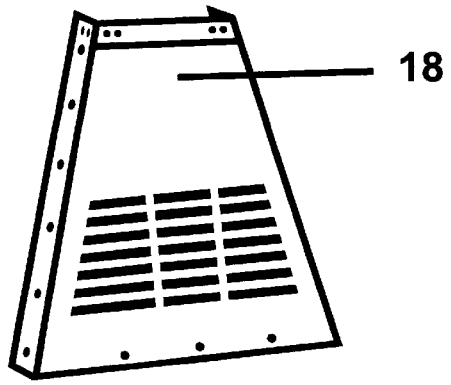

R) FIGS. 13-A, 13-B and 13-C depict the side panels of the unit.

DETAILED DESCRIPTION OF THE INVENTION

The following, is a description of the specifications required to explain the manner and process of making and using a weather shield and solar heat collector per reflector, the invention, which acts as a cover, shield, air flow regulator, and energy saver, when installed surrounding the exterior unit of a heat pump or air conditioning system.

Since varying sizes and shapes of said exterior units exist, the manufacture of the weather shield will be varied to meet the wide range of sizes and shapes, which presently exit or will be produced. The drawings submitted are of one shape style and should not be interpreted as the shape of the weather shield, but as one of many styles of sizes and shapes. The manufacture of the said weather shield can be produced by following the basic guidelines set forth, and production techniques used to tailor sizes and shapes, such as curved panels to produce a cone shaped weather shield.

Figure 1:
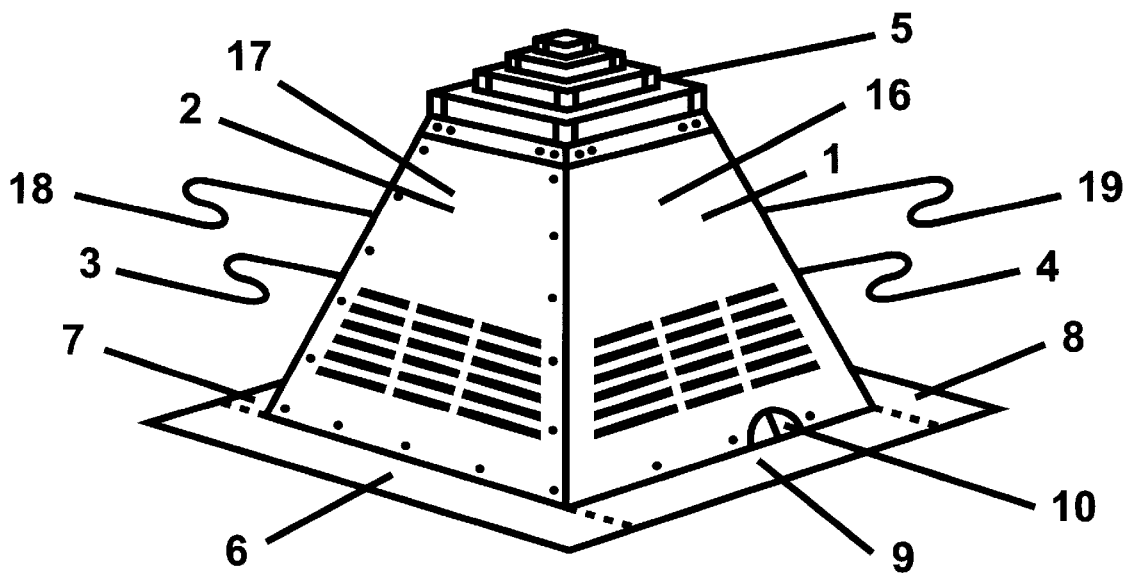
FIG. 01, depicts a fully assembled weather shield and solar heat collector per reflector, with numbering of the component parts, and indicator lines drawn to said component parts, B)
Figure 2:
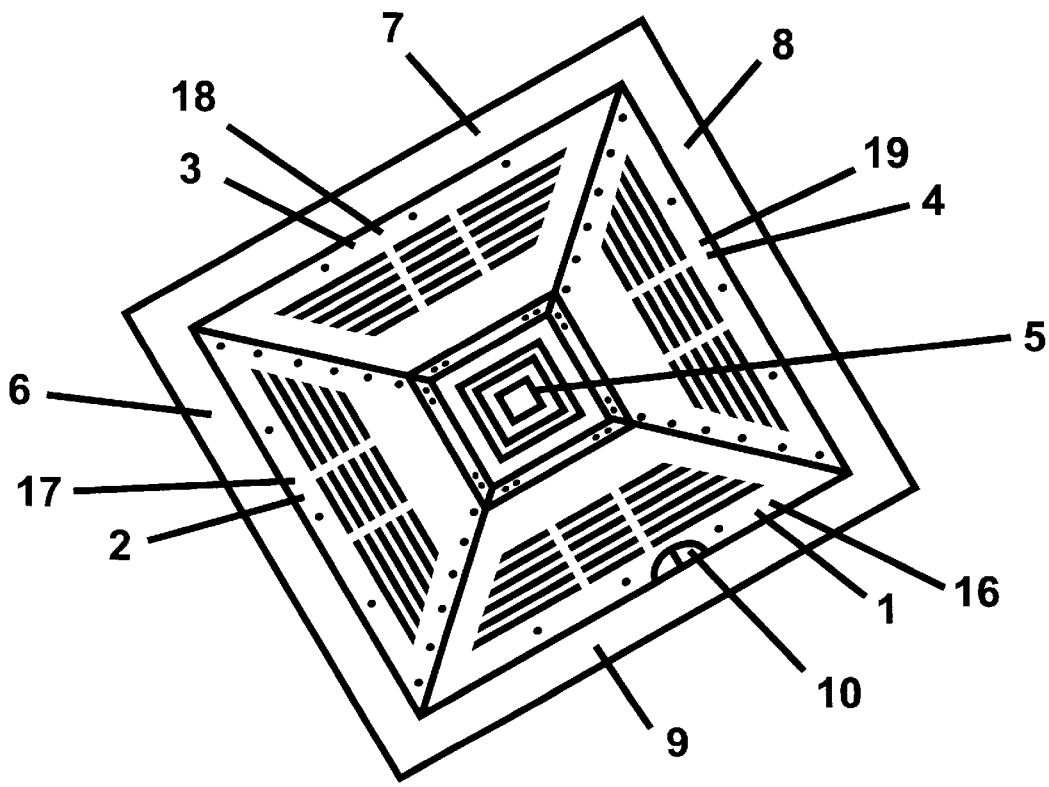
FIG. 02, depicts a top oversight view, of said weather shield, with numbered side panel parts, displaying a view of all sides of the invention, C)
Figure 6:
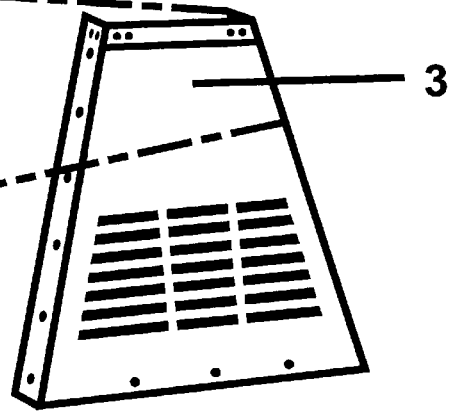
FIG. 06, depicts, a full view of said second type component side panel, showing an overall positioning of said tooling of air vent openings and anchor plate brackets, G) FIG. 07-A, depicts a third type of component side panel, with necessary tooling of said air vent openings, anchor plate brackets, and a portal offset cut-out, with a flexible rubber seal bushing affixed to said third component, by means of drilled bolt holes and bolts, H) FIG. 07-B, depicts an exploded view of a section of FIG. 07-A, being a third type component of said side panels, which displays an enhanced view of said flexible rubber seal bushing, as affixed to said portal offset cut out, also illustrated in FIG. 07-A, I)

The following directions should serve as a basic guideline, to produce, the said weather shield:

A) Materials used should be of a rigid material of sufficient size and shape, to accommodate the complete surrounding of said exterior unit:

1) Side panels, part 1,2,3, and 4 should be produced, as illustrated in FIGS. 01,02.03, and FIG. 06, with the number of side panels being dependent upon the shape required to match the said exterior unit; a pyramidal shape would require four side panels, a cone shape would use a number of said side panels, that are determined by the size required and the curvature of said panels.

Figure 3:
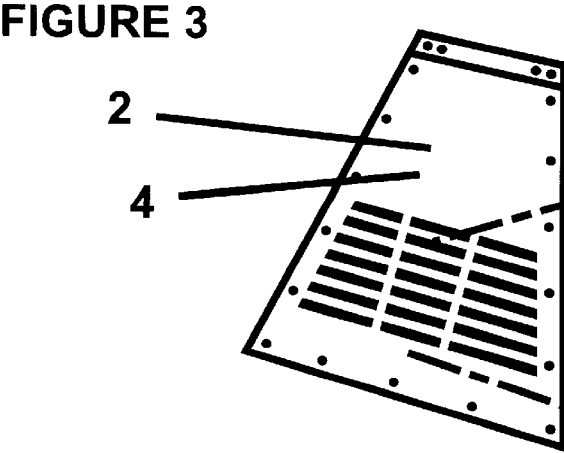
FIG. 03, depicts a type of component side panel, with tooling of air vent openings, and bolt holes, for said side panel attachment, and anchor plate brackets, on top section corners for attachment of the top cover diffuser, D)
Figure 4:
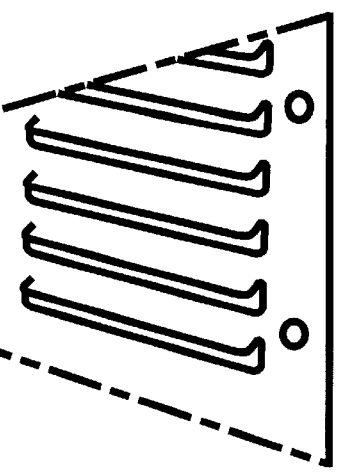
FIG. 04, depicts an exploded view of a portion of said component side panel, which is illustrated in FIG. 03, that allow an enhanced view of greater detail, to show the relationship or order of assembly of various parts, E)
Figure 5:
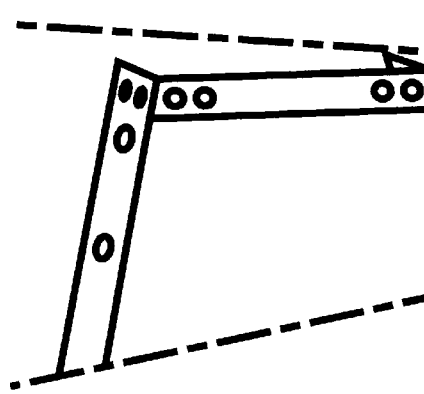
FIG. 05, depicts an exploded view of a portion of FIG. 06, being a second type component side panel, with necessary tooling of air vent openings and anchor plate brackets, for the attachment to said first type component side panel and said top cover diffuser, F)
Figures 7A, 7B:
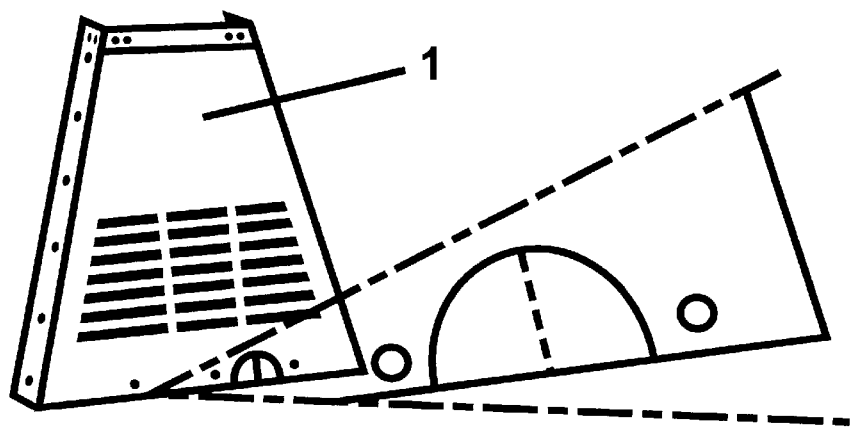
Figure 8:
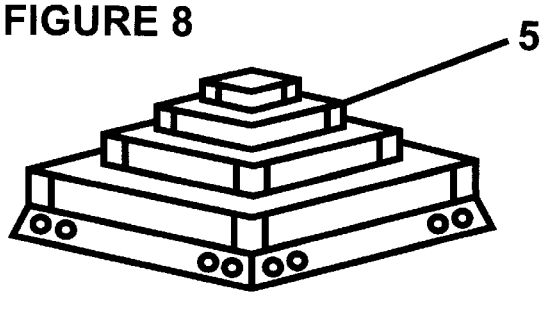
FIG. 08, depicts the top cover diffuser, with necessary tooling, of bolt holes to allow a firm attachment to the top corner of assembled said side panels, by means of a base plate, with tooled bolt holes, corresponding to anchor plates tooled on said panels, J) FIG. 09-A, depicts a type of component bottom panel or leveling plate, with the necessary tooling of bolt holes of oval shape, and an angle bend of the desired angle to achieve proper alignment of said side panels into a fully assembled unit, of said weather shield, K) FIG. 09-B, depicts a second type of component bottom panel or leveling plate, with the necessary tooling of said oval shaped bolt holes, and said angle bend, with the addition of a portal offset cut out, which is used in conjunction with said flexible rubber seal bushing, as illustrated per FIG. 07-A and FIG. 07-B, L) FIG. 10-A, depicts a side view, of an air regulator panel, with the necessary tooling of angle bends, and drilled bolt holes, to facilitate the firm attachment of said air regulator panel, to top of said side panels, and to the top of each side exterior unit, with view of FIG. 10-A, illustrating the styrofoam insulation, sandwiched between the two shell panels of the said air regulator, M) FIG. 10-B, depicts a frontal view of said air regulator panel, with necessary tooling of bolt holes and angle bends, which illustrates an enhanced detail of said air regulator panel, a typical component to be used in connection with each side panel, N) FIG. 10-C, depicts a second type view, of said air regulator panel, with said tooling to affix said air regulator panel to the top section of said side panel, O) FIG. 11-A, depicts an exposed view of the said weather shield, illustrating the said exterior unit, with said air regulator panels assembled, with the said; top diffusor, side panel part one, and panel part nine removed, P) FIG. 11-B depicts a top oversight view, of said weather shield, with numbering of said air regulator panels, illustrating the positioning, of said air regulator panels in relation to said side panels, and said exterior unit, which is completely surrounded by said weather shield, Q)

2) Said side panels, should have intake air vents, per FIG. 01, FIG. 03, and FIG. 04, with adequate opening space to allow a flow of air, to pass through the heat exchanger of said exterior unit, which meets the performance rate or standards required for said exterior unit, 3) Bolt holes should be tooled on said side panels, as illustrated in FIG. 03 and FIG. 04, with bolt anchor plate brackets assembled, on said side panels per FIG. 05 and FIG. 06, 4) a portal offset cut, should be made in one of the said side panels. to allow an opening for the wiring and piping of said exterior unit, per FIG. 07-A and FIG. 07-B, 5) A flexible rubber seal bushing, should be made to form an insulator, to protect said wiring and piping, per FIG. 07-A and FIG. 07-B, 6) a top cover diffuser, should be produced, which has a cover area, equal to the area of the opening formed by the connection of the top corners, produced by joining of, said side panels, as illustrated in FIG. 02, to attach said top cover diffuser, by means of a base plate, with tooled bolt holes, per FIG. 08, the size and shape, of air vent openings, being determined by the said opening space required to allow the exit flow of air, that has been forced through the said heat exchanger, by the said exterior unit fan.

Figure 9A:
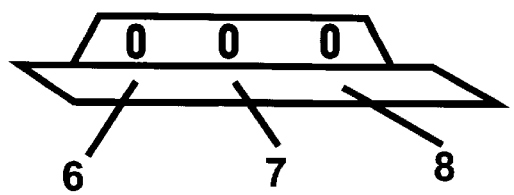
Figure 10A:
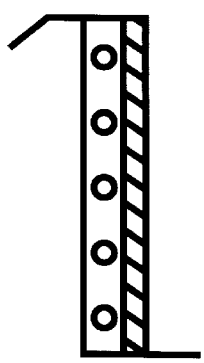
Figure 9B:
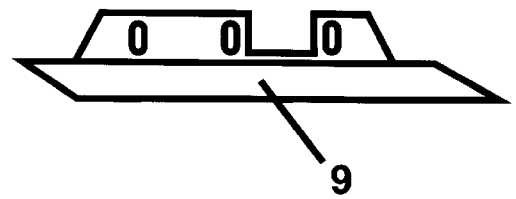
Figure 10B:
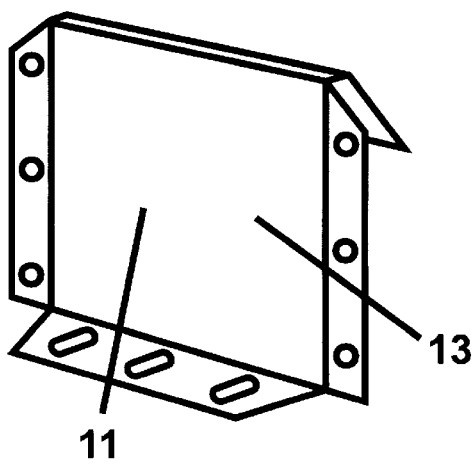
Figure 10C:
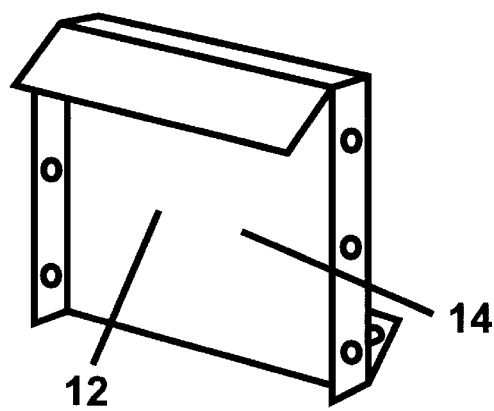
Figure 11:
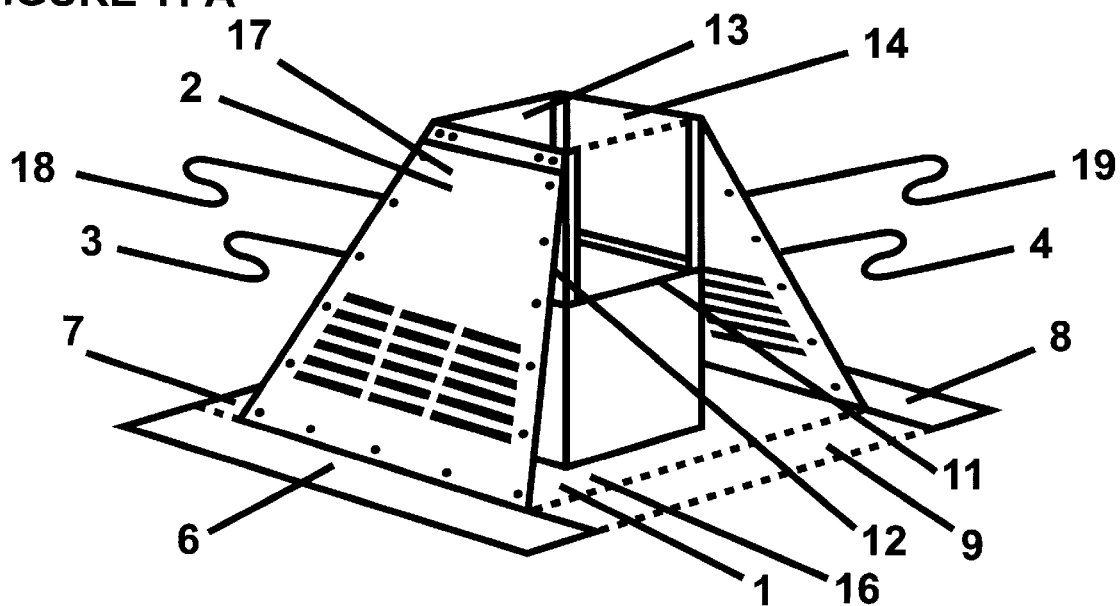
Figure 11:
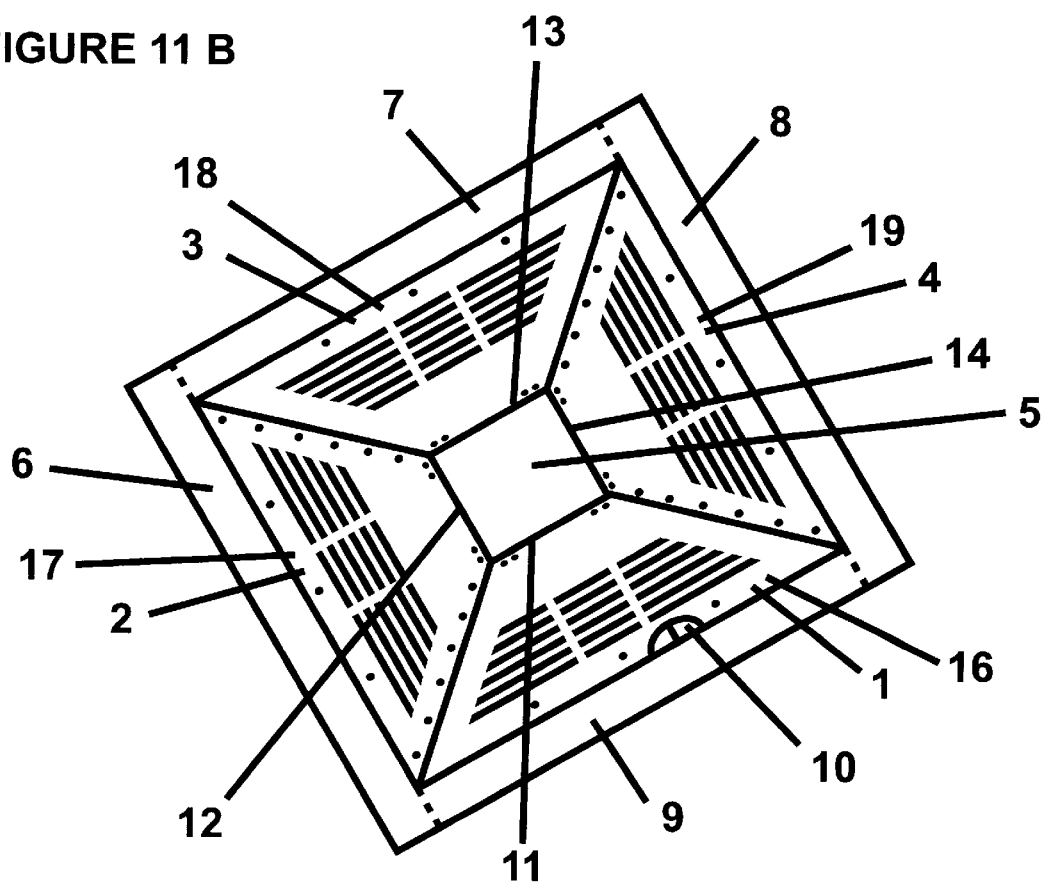
Figure 12:
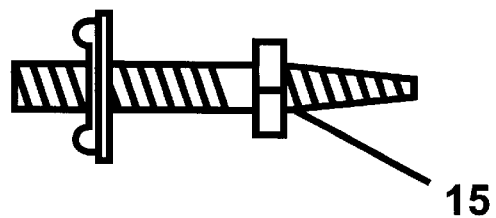
FIG. 12, depicts a side view, which illustrates the dual functioning ends, of a wing nut bolt per screw, which can be fastened firmly into the corresponding said anchor plate bracket, and at opposite end by means of a wing nut, an easy access machine thread bolt.

7) Screw holes should be tooled on said top cover diffuser base plate, as illustrated in FIG. 08, with corresponding anchor plate brackets installed at the top intersecting corners of said side panels, 8) the bottom panel or leveling platform, should have an oval shaped slide hole, on the upright section, per FIG. 09-A and FIG. 09-B, with a said portal offset cut on one of said bottom panels to allow the flexible rubber seal bushing, per FIG. 07-A and FIG. 07-B, to be installed in a manner that will safely encompass the said piping and wiring, 9) the said; side panels, top cover diffuser, and bottom panels should be coated with;

A) a black absorbant pigment coating for a weather shield produced for a heat pump system, B) a white reflective pigment coating for a weather shield produced for an air conditioning system, 10) an air flow regulator panel produced per FIG. 10-A, FIG. 10-B, and FIG. 10-C with a length sufficient, to be affixed at one end, to the top section of each of said side panels, by means of screw bolts and extend to the top of said exterior unit, to be affixed by said screw bolts, per FIG. 11-A, 11) a wing nut bolt per screw, easy access bolt, should be produced as illustrated in FIG. 12

12) a plurality of white side panels, sufficient to completely surround a pre-installed weather shield of a heat pump, only, should, by means of a rigid material, such as, but not limited to plastic, be produced as part 16, per FIG. 13-A; part 17, per FIG. 13-B; part 18, per FIG. 13-C; and part 19, per FIG. 13-B, with tooling in exact design, size, and shape as part 1,2,3, and 4 of FIG. 01., said white side panels, to be attachable per removable, dependent upon the cooling and heating mode of said exterior unit, of heat pump systems only!

13) said air regulator panel, should be produced with a double layer panel, per FIG. 10-A, to accommodate a styrofoam insulation, sandwiched between said double layer panel, 14) said air regulator panel, should be tooled with the angle bends and, bolt holes, illustrated in FIG. 10-B and FIG. 10-C, with bolt holes in the bottom section, per FIG. 10-B, being either spaced as to correspond to anchor plate on said exterior unit, or be of sufficient number to accommodate an adequate attachment to said exterior unit.

The following, is a step by step list of instructions, to be used to assemble, said weather shield, A) step;

1) the one bottom panel, part 9, per FIG. 01 and FIG. 09-B, should be placed under the piping and wiring of said exterior unit, so as to fully encompass, the said piping and wiring, by means of a flexible rubber seal bushing, part 10, also, per illustration in FIG. 01, 2) a side panel, part 1, per FIG. 01, should be placed, so as to allow the adjoined said rubber seal bushing to fully encompass, said piping and wiring, supplied bolts should be used to firmly attach part 1, per FIG. 01, FIG. 07-A and FIG. 07-B, to part 9, per FIG. 01 and FIG. 09-B, 3) an air regulator panel, part 11, per FIG. 11-A and FIG. 11-B, should be bolted to the top, of said panel, the appropriate end to attach being evident by size, bolt hole pattern, and angle bend of connector joint, the opposite end should be attached, by means of bolts, to said exterior unit, 4) the remaining bottom panels, parts 6,7, and 8, per FIG. 01 and FIG. 09-A, should be firmly attached, by means of bolts to said side panels, parts 2,3, and 4, illustrated in FIGS. 01,02,03, and FIG. 06, 5) side panel, part 2, per FIG. 01, should be placed to form a corner connection with said side panel, part 1, and be firmly attached, by means of bolts, 6) an air regulator panel, part 12, per FIG. 11-B, should be bolted to the top, of said side panel, part 2, perdirections to be repeated in step 3, 7) said side panel, part 3, per FIG. 01, should be placed to form a corner connection with said side panel, part 2, and be firmly attached, by means of bolts, 8) an air regulator panel, part 13, FIG. 11-B, should be bolted to the top section, of said side panel, part 3, per directions to be repeated in step 3, 9) said side panel, part 4, per FIG. 01, should be placed to form a corner connection with said side panel, part 3, and be firmly attached, by means of bolts, 10) an air regulator panel, part 14, FIG. 11-B, should be bolted to the top section, of said side panel, part 4, perdirection to be repeated in step 3, 11) the remaining corner, of part 4 and part 1, per FIG. 01, should be firmly attached by bolts, 12) the top cover diffuser, part 5, per FIG. 01, and FIG. 08, should be firmly assembled on top of the said weather shield, bolt said top cover diffuser base plate, to corresponding anchor plate brackets, located at each top corner of said side panels, 13) a wing nut bolt per screw, will be supplied by the manufacturer, part 15, per FIG. 12, The following instructions are to be used for the weather shield of a heat pump system;

A) a plurality of white side panels, by means of attachment or removal, being parts 16,17,18, and 19, FIGS. 13-A, 13-B, and 13-C, of sufficient number to completely cover the said weather shield, will be supplied by the manufacturer, to be installed, by means of easy access wing nut bolts, in a manner to completely surround said weather shield, with a second covering of attachable, said white side panels, for use during the cooling mode season, of said heat pump system, by;

A) removing wing nuts from installed weather shield, one panel at a time,

B) place said white side panel over a corresponding pre-installed black side panel of existing, said weather shield, by the following steps, 1) step one, a white side panel, part 16, FIG. 13-A, should be placed over part 1, refer to FIG. 01, by means of said wing nut bolts, 2) step two, a white side panel, part 17, FIG. 13-B, should be placed over part 2, per FIG. 01, by means of said bolts, 3) step three, a white side panel, part 18, FIG. 13-C, should be placed over part 3, per FIG. 02, by means of said bolts, 4) step four, a white side panel, part 19, FIG. 13-B, should be placed over part 4, per FIG. 02, by means of said bolts, C) Firmly tighten, said wing nut bolts, to assure a secure attachment of said white side panels.

What is claimed is:

1. A weather shield and solar heat collector per reflector, for energy efficiency and protecting the exterior unit of central air conditioning heat pump systems comprising:

A) a cover of rigid material, of sufficient size and shape, to accommodate the complete surrounding of said exterior unit, B) having means for attachment as to form a protective shell, The weather shield and solar heat collector per reflector further including:

A) a plurality of intake air vents to support an adequate air flow to reach and pass thru said exterior unit, B) a durable coating of black pigment, be applied to said cover for sufficient absorption of solar rays, C) a plurality of white panels, by means of attachment to, and with sufficient size and shape, to accommodate the complete surrounding of said cover, D) means for easy adjoining, of said white panels, with bolts, E) a portal hole of sufficient size, shape, and location on said cover, to accommodate the piping and wiring for the said exterior unit, by means of a flexible rubber bushing, insulator, to protect said piping and wiring, F) a plurality of air regulator panels, by means of attachment to, and with sufficient size and shape to accommodate the separation of air flow currents, by means of forced air, through said exterior unit, G) a plurality of air regulator panels, by means of attachment to, and with sufficient size, shape, and appropriate insulation, by means of attachment to said air regulator panels, to accommodate the complete coverage of area, by said insulation to said air regulator panels, H) a top cover diffuser, of adequate size and shape, to accommodate the exit flow of forced air current, having been passed through, the said exterior unit, The weather shield and solar heat collector per reflector further including:

I) a bottom panel leveling plate of rigid material, of sufficient size and shape, as to accommodate a base and leveling platform, for said protective shell, with slide bolt holes, by means of attachment, J) a wing nut bolt per screw, with a wing nut per washer, by means of attachment, to a machine thread bolt, with hex head screw attached, in one, said wing nut bolt per screw.

2. A weather shield and solar heat reflector, for energy efficiency and protecting the exterior unit of central air conditioning systems, comprising:

A) a cover of rigid material, of sufficient size and shape, to accommodate the complete surrounding of said exterior unit, B) having means for attachment, as to form a protective shell, The weather shield and solar heat reflector, further including:

A) a plurality of intake air vents, to support an adequate air flow to reach and pass thru, said exterior unit, B) a durable coating of white pigment, be applied to said cover, for sufficient reflection of solar rays, C) a portal hole of sufficient size, shape, and location on said cover, to accommodate the piping and wiring, for the said exterior unit, by means of a flexible rubber bushing, insulator, to protect said piping and wiring, D) a plurality of air regulator panels, by means of attachment to, and with sufficient size and shape to accommodate the separation of air flow currents, by means of forced air, through said exterior unit, E) a plurality of air regulator panels, by means of attachment to, and with sufficient size, shape, and appropriate insulation, by means of attachment to said air regulator panels, to accommodate the complete coverage of area, said insulation, of air regulator panels, F) a top cover diffuser, of adequate size and shape, to accommodate the exit flow of forced air current, having been passed through, the said exterior unit, G) a bottom panel per leveling plate, of rigid material, of sufficient size and shape, as to accommodate a base and leveling platform, for said protective shell, with slide bolt holes, by means of attachment, H) a wing nut bolt per screw, with a wing nut per washer, by means of attachment, to a machine thread bolt, with hex head screw attached, in one, said wing nut bolt per screw.

* * * * *